J. C. Plumer,
Furniture Caster.

No. 55,358. Patented June 5, 1866.

Witnesses:
J. F. Richardson
Edward Nutter

Inventor:
J. C. Plumer

UNITED STATES PATENT OFFICE.

J. C. PLUMER, OF BOSTON, MASSACHUSETTS.

CASTER FOR FURNITURE.

Specification forming part of Letters Patent No. 55,358, dated June 5, 1866.

*To all whom it may concern:*

Be it known that I, J. C. PLUMER, of Boston, in the Commonwealth of Massachusetts, have invented a new and Improved Caster for Furniture; and I do hereby declare the following to be a full, clear, and exact description of the same, reference being had to the accompanying drawings, making part of this specification, in which—

Figure 2:
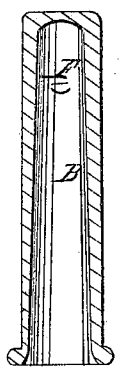
Figure 1:
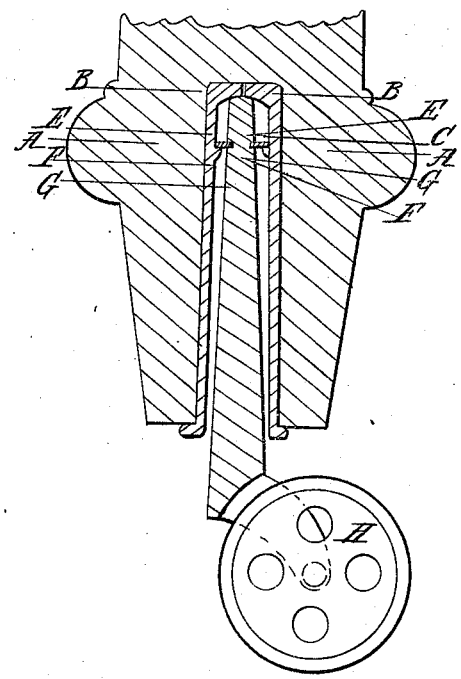
Figure 3:
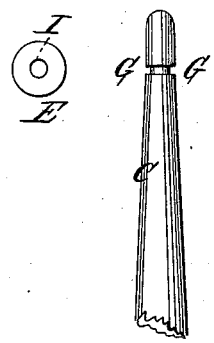

Figure 1 represents a view of my improved caster and the manner in which it is attached to any article of furniture; Fig. 2, a section of the caster-socket with the shoulders F; Fig. 3, a rubber or leather disk, E, and the caster-spindle with the depression G G for its reception.

The object of my invention is to construct a caster in such a manner that it will remain in place when the article to which it is applied is raised from the floor.

My invention consists in providing the spindle of the caster with a support of sheet-rubber, rubber cloth, leather, or other similar flexible and elastic material, which, resting upon projections, serves for a support to the caster-spindle. A little more force than the weight of the caster exerted upon the disk will remove and replace the whole at pleasure, while the disk will securely sustain the caster in its proper position.

I construct my improved caster by providing the inner surface of the socket B, Fig. 2, with one or more projections, F, which may be made in the same piece with the socket when of cast metal, and made in halves, as shown in Fig. 2, or they may be affixed to the inner surface when made in tubular form by perforating the sides and then inserting a piece of metal or other suitable substance. I then provide the spindle C, Fig. 3, with the support in the form of the perforated disk E, which may be secured to the spindle by having it smaller, or a recess being made, as shown at G G, the part where the support is attached, or by the use of cement; but these methods I do not enumerate as new. The spindle C thus provided with the support is pushed into the socket provided with the projection F, by which it is bent or pressed aside till it has passed beyond the projection, when, regaining its form, its margin will rest upon the projections supporting the spindle in the socket, not, however, pressing against the sides of the socket with sufficient force to prevent the spindle from turning in the socket.

I am aware of the existence of Letters Patent numbered 20,031 and 10,488; but the latter is unlike mine, consisting of a spring-clasp of metal, and operating in a different manner and place, while my invention operates by means of an elastic support to the spindle.

I am also aware of other improvements in casters, consisting in retaining the spindle in the socket by the use of a spring-clasp; but they are all different from mine in the particulars above named.

I do not claim the shank or spindle having a circular recess or groove, or the same provided with spring-clasp to press against or be received into a groove or recess on the inner surface of the socket, or a spring affixed to the inner surface of the socket to clasp the spindle or shank of the caster. Neither do I claim the retention of the spindle within the socket by providing either with a spring to adhere to the other.

What I claim as my invention, and desire to secure by Letters Patent, is—

1. The use of a disk of rubber, leather, or other similar flexible material for the purpose of retaining the caster-spindle in its place, in the manner set forth.

2. The combination of the circular support E and the shoulders F, as and for the objects specified.

J. C. PLUMER.

Witnesses:
 WILLIAM H. CLIFFORD,
 L. CLIFFORD WADE.